(12) United States Patent
Liang et al.

(10) Patent No.: US 8,792,229 B2
(45) Date of Patent: Jul. 29, 2014

(54) COMPONENT ENGAGING MECHANISM FOR AN ELECTRONIC DEVICE

(75) Inventors: Chen-Yi Liang, New Taipei (TW); Cheng-Hsiang Chuang, New Taipei (TW); Chun-Chien Chen, New Taipei (TW); Shun-De Bai, New Taipei (TW); San-Pao Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 110 days.

(21) Appl. No.: 13/451,035

(22) Filed: Apr. 19, 2012

(65) Prior Publication Data

US 2012/0307428 A1 Dec. 6, 2012

(30) Foreign Application Priority Data

May 31, 2011 (TW) .............................. 100119048 A (51) Int. Cl.
*G06F 1/16* (2006.01)
*H05K 5/00* (2006.01)
*H05K 7/00* (2006.01)
*H01M 2/10* (2006.01)

(52) U.S. Cl.
CPC ............... *G06F 1/1635* (2013.01); *Y02E 60/12* (2013.01); *H01M 2/1022* (2013.01)
USPC ............. 361/679.02; 361/679.01; 361/679.58

(58) Field of Classification Search
USPC ........................... 361/679.01, 679.02, 679.43
See application file for complete search history.

(56) References Cited

U.S. PATENT DOCUMENTS

| | | | | |
|---|---|---|---|---|
| 5,465,191 A * | 11/1995 | Nomura et al. | .......... | 361/679.27 |
| 6,473,302 B1 * | 10/2002 | Korycan et al. | .......... | 361/679.43 |
| 6,762,928 B2 * | 7/2004 | Lo | .............................. | 361/679.58 |
| 7,427,086 B2 * | 9/2008 | Park et al. | ........................ | 292/95 |
| 7,644,963 B2 * | 1/2010 | Fan et al. | ......................... | 292/95 |
| 8,172,282 B2 * | 5/2012 | Lev et al. | ....................... | 292/164 |
| 2004/0032708 A1 * | 2/2004 | Lo | ................................... | 361/681 |
| 2007/0076367 A1 * | 4/2007 | Chien et al. | .................... | 361/686 |
| 2009/0310341 A1 * | 12/2009 | Yu et al. | ......................... | 362/190 |
| 2010/0021803 A1 | 1/2010 | Wang | | |

FOREIGN PATENT DOCUMENTS

| | | |
|---|---|---|
| CN | 2646764 Y | 10/2004 |
| CN | 2012/52124 Y | 6/2009 |
| CN | 101635338 A | 1/2010 |
| TW | M-265673 U | 5/2005 |

OTHER PUBLICATIONS

Office Action for Chinese Application No. 201110167277.X dated Mar. 7, 2014.
Office Action for Taiwanese Application No. 100119948 dated Sep. 9, 2013 (previously cited).

* cited by examiner

*Primary Examiner* — Lisa Lea Edmonds
*Assistant Examiner* — Keith Depew
(74) *Attorney, Agent, or Firm* — Alston & Bird LLP (57) ABSTRACT

In an assembly of an electronic device and a battery, the battery includes a protrusion that is formed with an engaging hole, and the electronic device includes a housing and an engaging unit. The housing defines a receiving space and is formed with a first opening that is adapted for extension of the protrusion. The engaging unit includes a main body pivotable relative to the housing, an actuating member accessible from outside of the receiving space, and an engaging hook disposed on the main body adjacent to the first opening. The engaging hook is engageable with the engaging hole in the protrusion. The actuating member is actuable to pivot the main body so as to disengage the engaging hook from the engaging hole.

7 Claims, 12 Drawing Sheets

COMPONENT ENGAGING MECHANISM FOR AN ELECTRONIC DEVICE

CROSS-REFERENCE TO RELATED APPLICATION

This application claims priority of Taiwanese Patent Application No. 100119048, filed on May 31, 2011, and the disclosure of which is incorporated herein by reference.

BACKGROUND OF THE INVENTION

1. Field of the Invention

The present invention relates to an electronic device, more particularly to a battery engaging mechanism of an electronic device.

2. Description of the Related Art

For the purpose of using without the restriction of a power cord, a conventional notebook computer generally includes a battery combinable with a main frame of the notebook computer for providing power. The battery may be combined with the main frame of the notebook computer by way of engagement, such as that disclosed in United States Patent Application Publication No. 2009/0310341.

SUMMARY OF THE INVENTION

Therefore, an object of the present invention is to provide an electronic device with an improved engagement structure, and an assembly of the same and a battery.

The assembly according to the present invention comprises an electronic device and a battery.

The battery includes a protrusion that is formed with an engaging hole.

The electronic device includes a housing and an engaging mechanism. The housing defines a receiving space and is formed with a first opening that is in spatial communication with the receiving space and that is adapted for extension of the protrusion of the battery into the receiving space when the battery is to combine with the electronic device. The engaging mechanism includes an engaging unit. The engaging unit includes a main body pivotable relative to the housing, an actuating member disposed on the main body and accessible from outside of the receiving space, and an engaging hook disposed on the main body adjacent to the first opening. The engaging hook is adapted for engaging the engaging hole in the protrusion when the battery is combined with the electronic device. The actuating member is actuable to pivot the main body so as to disengage the engaging hook from the engaging hole.

A first effect of the present invention resides in providing an engaging mechanism actuable with a poking operation.

Further, the housing includes a first wall extending parallel to a reference plane, and a second wall connected with the first wall, extending perpendicular to the reference plane, and cooperating with the first wall to define the receiving space. The main body of the engaging unit is pivotable relative to the first wall. The first opening is formed in the second wall. The engaging hook has an inclined guiding surface which faces the first opening when the engaging hook is disposed in a steady state. The inclined guiding surface is pushed against by the protrusion of the battery as the protrusion extends into and through the first opening, such that the engaging hook moves to bring the main body to pivot relative to the first wall to permit further extension of the protrusion through the first opening.

A second effect of the present invention resides in that, by means of the inclined guiding surface, the engaging unit may engage the engaging hole merely through pushing of the protrusion against the inclined guiding surface when combining the battery with the electronic device without having to operate the operating unit.

Further, the engaging hook includes a first hook section and a second hook section. The first hook section extends from the main body toward the second wall, and the second hook section extends from the first hook section toward the first wall when the engaging hook is disposed in the steady state.

A third effect of the present invention resides in that an extending direction of the second hook section may prevent unintentional disengagement of the engaging hook from the engaging hole.

Further, the first wall is formed with a second opening in spatial communication with the receiving space. The housing further includes a pair of first pivot pieces which are disposed on the first wall and which are respectively located at two opposite sides of the second opening. The engaging mechanism further includes a pivot unit. The main body is disposed between the first pivot pieces and is pivotable relative to the first wall by means of the pivot unit.

Further, the main body has a first portion generally disposed in the receiving space, and a second portion generally exposed outside of the receiving space through the second opening to serve as the actuating member of the engaging unit.

Further, the pivot unit includes two pivot sections fixed to and protruding outwardly from two opposite sides of the main body. Each of the first pivot pieces has an inclined end surface and is formed with a pivot groove. The inclined end surfaces of the first pivot pieces face each other and are inclined away from the first wall and away from each other for guiding the pivot sections to be moved toward the first wall and to engage rotatably the pivot grooves such that the main body is disposed between the first pivot pieces and is pivotable relative to the first wall.

A fourth effect of the present invention resides in that the engaging unit may be disposed between the first pivot pieces with relative ease by means of the inclined end surfaces.

Further, the engaging mechanism further includes a resilient element configured to provide a biasing force to bias the engaging hook to remain in the steady state, where the engaging hook engages the engaging hole when the battery is combined with the electronic device. The housing further includes a first stop member. The first stop member includes a first section that is connected to and that extends away from the first wall, and a second section that extends from the first section to be spaced apart from the first wall. The pivot unit includes a pivot shaft extending through and fixed to the main body, and a stop element coupled to the pivot shaft. The stop element abuts against one side of the second section of the first stop member proximate to the first wall when the engaging hook engages the engaging hole in the protrusion.

Through the provision of the resilient element in cooperation with the first stop member and the stop element, the engaging hook of the engaging unit may return to the steady state after the operation of pivoting the main body is finished.

Further, the housing further includes a first mounting element disposed on the first wall. The engaging unit further includes a second mounting element. The resilient element includes two resilient arms respectively mounted on the first and second mounting elements.

Further, the main body of the engaging unit is in the form of a plate and is disposed outside of the receiving space. The engaging hook of the engaging unit is formed protrudingly from the plate and is extendible into the receiving space through the second opening to engage the engaging hole in the protrusion of the battery when the battery is combined with the electronic device. The actuating member is an integral part of the plate actuable to remove the engaging hook from the receiving space through the second opening so as to be disengaged from the engaging hole.

Further, the engaging unit further includes a pair of second pivot pieces formed on the plate, coupled to and between the first pivot pieces by means of the pivot unit, and pivotable along with the main body relative to the first wall. The second pivot pieces are pushed against by the protrusion of the battery when the engaging hook engages the engaging hole in the protrusion so as to prevent pivotal movement of the main body which results in removal of the engaging hook from the receiving space through the second opening.

Further, the housing further includes an inclined stop wall which is inclined away from the first wall and the second wall, and which is disposed in the receiving space and adjacent to the second opening. The inclined stop wall defines a recess outside of the receiving space. The first pivot pieces are located in the receiving space between the inclined stop wall and the second opening. The plate is divided into a first plate section corresponding to the second opening and a second plate section corresponding to the recess. The engaging hook is formed protrudingly from the first plate section. The second plate section serves as the actuating member and is pushed into the recess for removing the engaging hook from the receiving space through the second opening.

Further, the housing further includes a second stop member formed protrudingly from the first wall. Movement of the stop element of the pivot unit is limited between the second section of the first stop member and the second stop member.

Further, the engaging unit further includes a cover flange protruding laterally from a junction between the first and second portions of the main body. The cover flange corresponds in position to an edge that defines the second opening.

BRIEF DESCRIPTION OF THE DRAWINGS

Other features and advantages of the present invention will become apparent in the following detailed description of the two embodiments with reference to the accompanying drawings, of which.

DETAILED DESCRIPTION OF THE EMBODIMENTS

Before the present invention is described in greater detail with reference to the embodiments, it should be noted that the same reference numerals are used to denote the same elements throughout the following description.

Figure 1:
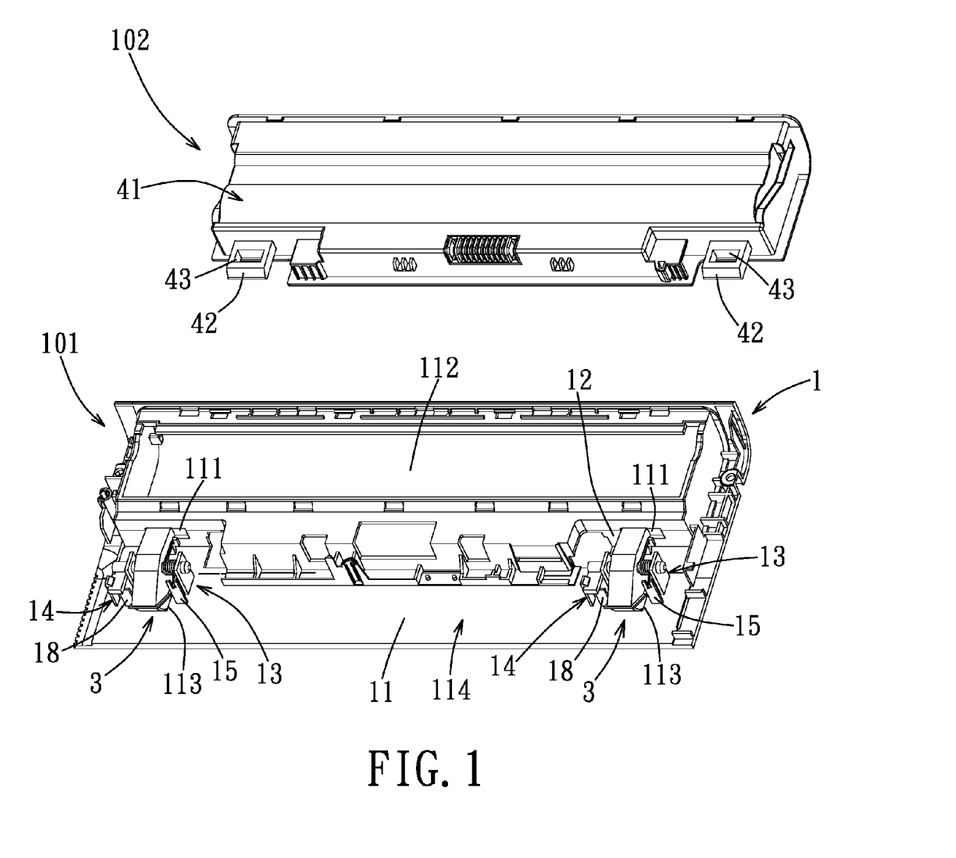
FIG. 1 is a perspective view illustrating a first embodiment of an assembly of an electronic device and a battery according to the present invention.

Referring to FIG. 1, a first embodiment of an assembly of an electronic device and a battery, according to the present invention, comprises an electronic device 101 and a battery 102. The battery 102 is combinable with the electronic device 101 and is providable of electricity for the electronic device 101. The battery 102 includes a battery body 41, and a pair of protrusions 42 which are disposed protrudingly on the battery body 41 and each of which is formed therethough with an engaging hole 43. The protrusions 42 extend parallel to a reference plane, and in this embodiment, the reference plane is a horizontal plane. The engaging holes 43 are formed in the protrusions 42 along a direction perpendicular to the reference plane.

Figure 2:
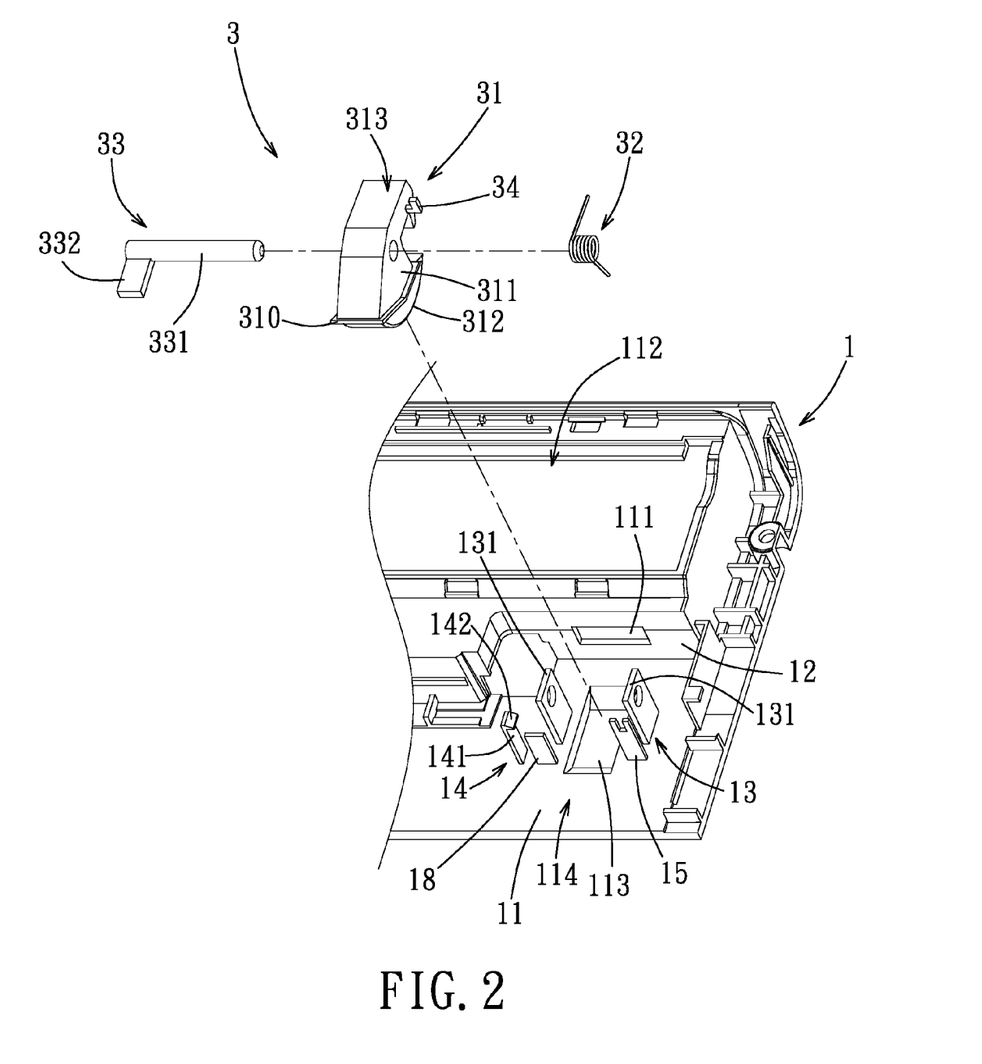
FIG. 2 is a partially enlarged exploded perspective view illustrating a housing and an engaging mechanism of the electronic device in the first embodiment.
Figure 3:
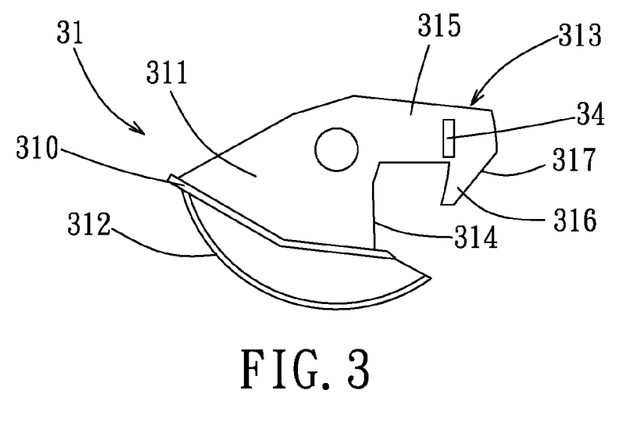
FIG. 3 is a schematic side view of an engaging unit of the engaging mechanism in the first embodiment.

Referring to FIG. 1 and FIG. 2, the electronic device 101 includes a housing 1, an electronic component module (not shown), and a pair of engaging mechanisms 3. In this embodiment, the electronic device 101 is a notebook computer. The housing 1 is formed with a pair of first openings 111. Specifically, the housing 1 is a casing of the notebook computer. The housing 1 defines a receiving space 114 for receiving the electronic component module (not shown, including a motherboard, a central processing unit, a hard disk, an optical disk drive, etc.). The first openings 111 are in spatial communication with the receiving space 114. The housing further defines an accommodating space 112 for accommodating the battery 102. In particular, the housing 1 includes a first wall 11 extending parallel to the reference plane, and a second wall 12 connected with the first wall 11, extending perpendicular to the reference plane, and cooperating with the first wall 11 to define the receiving space 114. The first openings 111 are formed in the second wall 12. Furthermore, the first wall 11 is formed with a pair of second openings 113 that are in spatial communication with the receiving space 114. The second openings 113 are respectively aligned with the first openings 111. The first openings 111 are further in spatial communication with the accommodating space 112.

In this embodiment, the housing 1 further includes a pair of pivot mounts 13, a pair of first stop members 14, a pair of first mounting elements 15, and a pair of second stop members 18. It is noted that only one in each pair of the first openings 111, the second openings 113, the pivot mounts 13, the first stop members 14, the first mounting elements 15, and the second stop members 18 is shown in FIG. 2 and is given detailed illustration in the following for the sake of brevity. The pivot mount 13 is disposed proximate to the second opening 113. In this embodiment, the pivot mount 13 includes a pair of first pivot pieces 131 which are respectively located at two opposite sides of the second opening 113. The first pivot pieces 131 extend away from the first wall 11 into the receiving space 114. The first stop member 14 is disposed proximate to the second opening 113. In this embodiment, the first stop member 14 is substantially in a shape of a hook, and includes a first section 141 that is connected to and that extends away from the first wall 11 into the receiving space 114, and a second section 142 that extends from the first section 141 to be spaced apart from the first wall 11. The first section 141 of the first stop member 14 is proximate to one of the first pivot pieces 131. The first mounting element 15 extends away from the first wall 11 into the receiving space 114 and is proximate to the second opening 113. The first mounting element 15 has a distal end formed with a notch. The second stop member 18 is formed protrudingly from the first wall into the receiving space 114 and is proximate to the first stop member 14.

Referring to FIG. 2 to FIG. 5, each of the engaging mechanisms 3 includes an engaging unit 31, a resilient element 32, and a pivot unit 33. The engaging unit 31 includes a main body 311, an actuating member 312, an engaging hook 313, a second mounting element 34, and a cover flange 310 formed on an outer peripheral surface of the main body 311. Specifically, the main body 311, the actuating member 312, and the engaging hook 313 of this embodiment are formed integrally. The main body 311 is substantially of a fan-shaped block having a curved end surface at a bottom thereof, and a push surface 314 at a lateral side thereof. The cover flange 310 protrudes laterally from and substantially surrounds the main body 311, and is substantially in a shape of a strip. The actuating member 312 is defined by the curved end surface of the main body 311. In other words, the curved end surface of the main body 311 serves as the actuating member 312. The engaging hook 313 is disposed at a top end of the main body 311 and includes a first hook section 315 and a second hook section 316. The first hook section 315 extends laterally from the main body 311, and the second hook section 316 extends downwardly from the first hook section 315 in a direction slightly toward the main body 311. The engaging hook 313 has an inclined guiding surface 317 formed on the second hook section 316 and facing away from the main body 311. The second mounting element 34 protrudes laterally from the engaging hook 313.

In this embodiment, the pivot unit 33 includes a pivot shaft 331, and a stop element 332 coupled to and protruding from one end of the pivot shaft 331. The pivot shaft 331 extends through and is fixed to the main body 311. The engaging unit 31 is disposed between the first pivot pieces 131 of the corresponding pivot mount 13, and is pivotable relative to the first wall 11 by means of extending the pivot shaft 331 through and coupling rotatably the pivot shaft 331 to the first pivot pieces 131. The main body 311 has a first portion generally disposed in the receiving space 114 of the housing 1, and a second portion generally exposed outside of the receiving space 114 through the second opening 113 to serve as the actuating member 312 of the engaging unit 31. The actuating member 312 is exposed and accessible from outside of the receiving space 114 through the second opening 113 (see FIG. 2) when the engaging unit 31 is disposed between the first pivot pieces 131 and is pivotable relative to the first wall 11 (see FIG. 5). The cover flange 310 protrudes laterally from a junction between the first and second portions of the main body 311, and corresponds in position to an edge that defines the second opening 113 in the first wall 11. When the engaging hook 313 is disposed in a steady state, the push surface 314 of the main body 311 faces the second wall 12, and the engaging hook 313 is disposed proximate to the first opening 111 of the second side wall 12 with the first hook section 315 extending toward the second wall 12, the second hook section 316 extending toward the first wall 11, and the inclined guiding surface 317 facing the second side wall 12 and aligned with the first opening 111 in the second side wall 12. Movement of the stop element 332 of the pivot unit 33 is limited between the second section 142 of the first stop member 14 and the second stop member 18. Moreover, the stop element 332 is disposed between said one of the first pivot pieces 131 and the first section 141 of the first stop member 14. In this embodiment, the arrangement of the first stop member 14 and the second stop member 18 limits movement of the stop element 332 to rotate along with the pivot shaft 331 within a range of about 90 degrees. Furthermore, the first section 141 of the first stop member 14 cooperates with the stop element 332 and said one of the first pivot pieces 131 proximate to the first stop member 14 to prevent removal of the pivot shaft 331 from the first pivot pieces 131 of the pivot mount 13.

In this embodiment, the resilient element 32 is a torsion spring disposed between the engaging unit 31 and the housing 1. Specifically, the resilient element 32 includes two resilient arms 321, and is sleeved on the pivot shaft 331 of the pivot unit 33 with the two resilient arms 321 respectively mounted on the second mounting element 34 of the engaging unit 31 and the notch in the first mounting element 15. The resilient element 32 provides a biasing force to bias the engaging hook 313 of the engaging unit 31 to move toward the first wall 11 of the housing 1 (i.e., downwardly in the Figures). Moreover, the biasing force, in cooperation with the stop element 332 of the pivot unit 33, which abuts against one side of the second section 142 of the first stop member 14 proximate to the first wall 11, ensures that the engaging unit 31 remains in a state, where the inclined guiding surface 317 of the engaging hook 313 and the first opening 111 in the second wall 12 are aligned with each other in a direction parallel to the reference plane. Meanwhile, the engaging hook 313 is disposed in the aforesaid steady state. The resilient element 32 is twisted to store a resilient storing force as the actuating member 312 is actuated to pivot the main body 311 so as to bring the engaging hook 313 to move away from the first wall 11.

Figure 5:
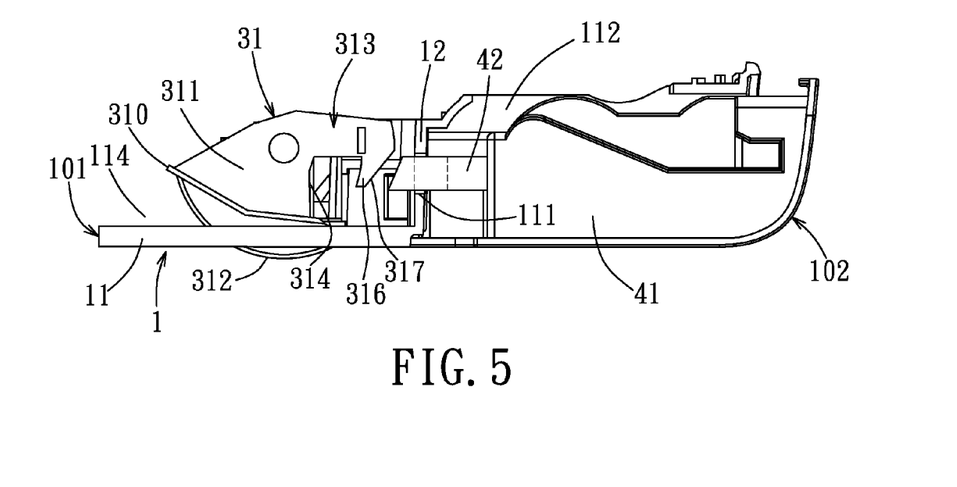
FIG. 5 to FIG. 8 are schematic side views illustrating operation of the engaging mechanism when the battery is combined with the electronic device.
Figure 6:
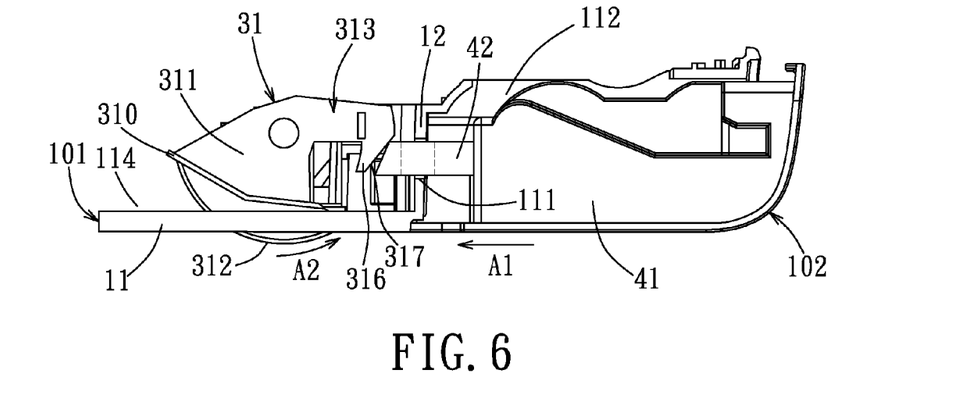
Figure 7:
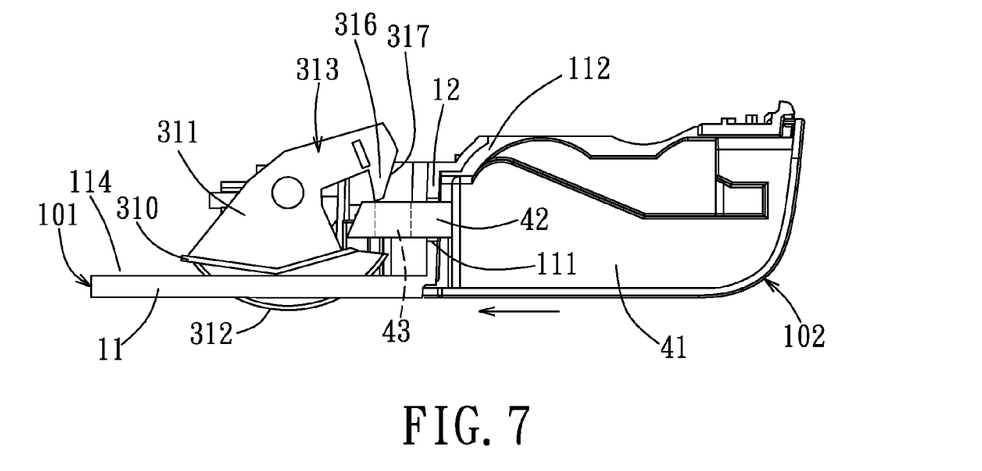
Figure 8:
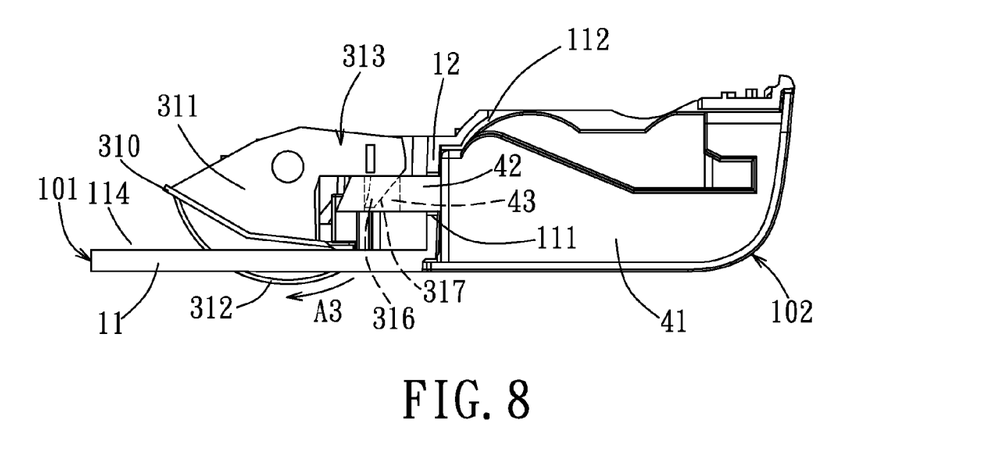

Referring to FIG. 1, when combining the battery 102 with the electronic device 101, the battery body 41 is to be accommodated in the accommodating space 112 defined by the housing 1, and the two protrusions 42 are to extend into the receiving space 114 respectively through the two first openings 111 in the second wall 12. Referring to FIG. 5, the relations among one of the protrusions 42, the corresponding engaging mechanism 3 and the corresponding first opening 111 will be discussed. Since the engaging unit 31 is disposed in the state where the inclined guiding surface 317 is aligned with the first opening 111, the protrusion 42 first pushes against the inclined guiding surface 317 (in a direction shown by arrow A1 in FIG. 6) when the protrusion 42 extends into the receiving space 114 through the first opening 111 as illustrated in FIG. 6, such that the inclined guiding surface 317 of the engaging hook 313 moves relative to the protrusion 42 and away from the first wall 11. That is, the engaging unit 31 is pushed against by the protrusion 42 such that the engaging hook 313 moves to bring the main body 311 to pivot relative to and away from the first wall 11 (in a direction shown by arrow A2 in FIG. 6) to permit further extension of the protrusion 42 through the first opening 111. At the same time, the engaging unit 31 brings the resilient element 32 to twist and store the resilient storing force. Referring to FIG. 7, the aforementioned movement continues until the engaging hook 313 is moved to one side of the protrusion 42 distal from the first wall 11. Moreover, with the protrusion 42 continuing to move to a position where the engaging hole 43 corresponds in position to the second hook section 316 of the engaging hook 313, the engaging unit 31 is biased by the resilient restoring force stored in the resilient element 32 to pivot relative to and toward the first wall 11 (in a direction shown by arrow A3 in FIG. 8), such that the second hook section 316 of the engaging hook 313 engages the engaging hole 43 so as to form a structural interference between the engaging hook 313 and the protrusion 42 to prevent movement of the protrusion 42 away from the receiving space 114 through the first opening 111. As a result, the battery 102 is combined firmly with the electronic device 101. Moreover, a direction in which the second hook section 316 extends may secure stability of the engagement between the second hook section 316 and the engaging hole 43 such that the engaging hook 313 may not be disengaged from the engaging hole 43 easily when the actuating member 312 is not actuated.

Figure 9:
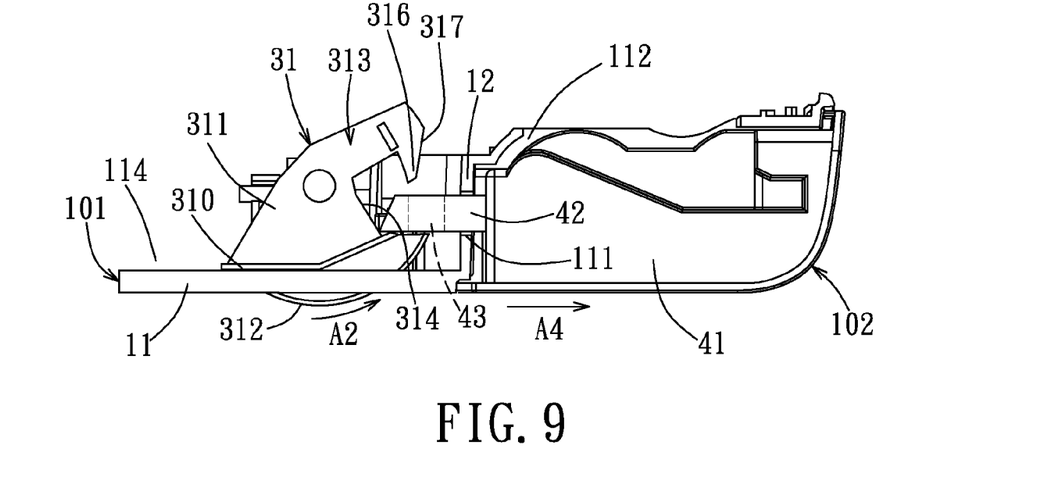
FIG. 9 and FIG. 10 are schematic side views illustrating the engaging unit being operated to push a protrusion of the battery towards removal from the electronic device.
Figure 10:
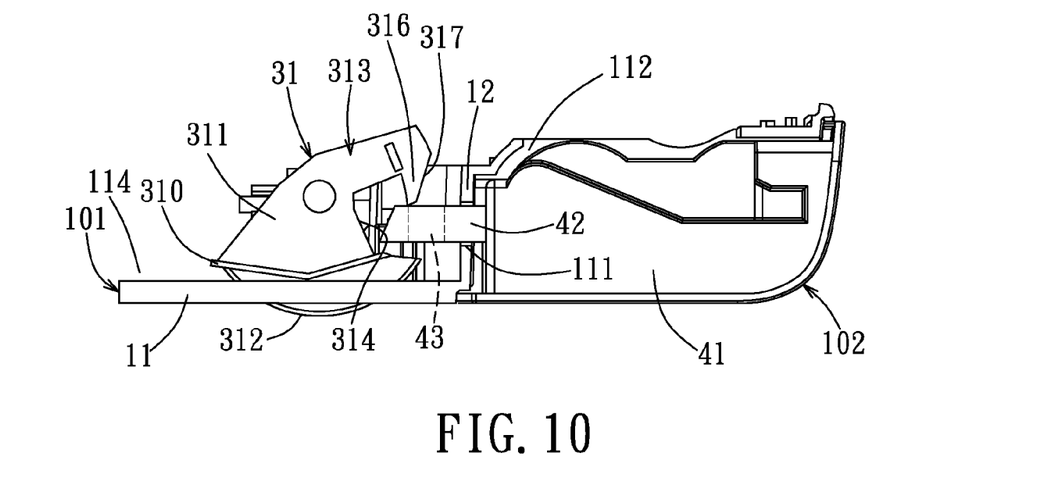

Referring to FIG. 9 and FIG. 10, when it is intended to remove the battery 102 from the electronic device 101, the actuating member 312 is to be actuated toward the second wall 12 (in the direction shown by arrow A2 in FIG. 9) to pivot the engaging unit 31 in a direction where the engaging hook 313 moves away from the first wall 11 such that the second hook section 316 of the engaging hook 313 is disengaged from the engaging hole 43 in the battery 102 thereby removing the structural interference between the engaging hook 313 and the protrusion 42. After the structural interference is removed, the protrusion 42 of the battery 102 may be moved away from the receiving space 114 through the first opening 111 (in the direction shown by arrow A4 in FIG. 9) so as to remove the battery 102 from the electronic device 101. It is noted that, during pivotal movement of the engaging unit 31 in the direction where the engaging hook 313 moves away from the first wall 11, the push surface 314 of the main body 311 is configured to gradually approach the protrusion 42, such that when the engaging hook 313 is disengaged from the engaging hole 43, the push surface 314 of the main body 311 urges the protrusion 42 to move in the direction shown by arrow A4 away from the receiving space 114 through the first opening 111 thereby misaligning the engaging hole 43 and the second hook section 316 of the engaging hook 313. In other words, the protrusion 42 is pushed away from the receiving space 114 through the first opening 111 such that the battery 102 is slightly pushed out of the accommodating space 112 as illustrated in FIG. 10 compared with FIG. 8 when the actuating member 312 is actuated to pivot the engaging unit 31 so as to remove the structural interference between the engaging hook 313 and the protrusion 42. An advantage of the aforementioned structural design resides in that even though the resilient element 32 (see FIG. 2) is providable of the biasing force to bias the engaging hook 313 to the steady state, where the engaging hook 313 would engage the engaging hole 43, the push surface 314 of the main body 311, being capable of pushing the protrusion 42 away from the receiving space 114 through the first opening 111 such that the engaging hole 43 in the protrusion 42 no longer corresponds in position to the second hook section 316 of the engaging hook 313, prevents the engaging hook 313 from engaging once again the engaging hole 43 when a force for actuating the engaging unit 31 to pivot is released immediately as the engaging hook 313 is disengaging from the engaging hole 43. Essentially, the push surface 314 generates a linkage-movement effect that the battery 102 is slightly pushed out of the accommodating space 112 of the housing 1 when a user actuates the actuating member 312 to pivot the engaging unit 31 so as to remove the structural interference between the engaging hook 313 and the protrusion 42. In a first aspect, the user is assured that an effect of actuating the actuating member 312 is achieved. In a second aspect, the user is free from being distracted to keep the actuating member 312 actuated while trying to remove the battery 102 from the electronic device 101.

Figure 4:
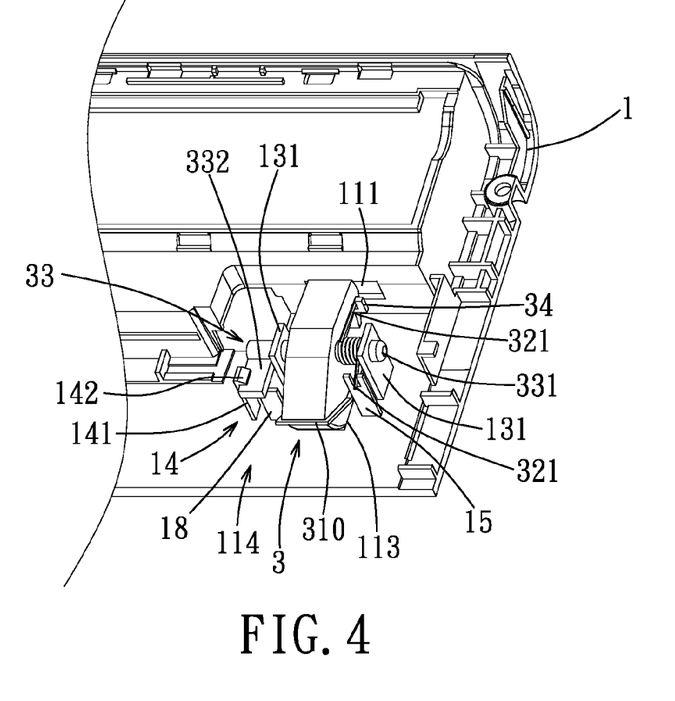
FIG. 4 is partially enlarged assembled perspective view illustrating the housing and the engaging mechanism in the first embodiment.

After the force for actuating the actuating member 312 to pivot the engaging unit 31 with the engaging hook 313 moving away from the first wall 11 is released, referring to FIG. 4 and FIG. 5, the resilient storing force of the resilient element 32 brings the engaging unit 31 to pivot with the engaging hook 313 moving toward the first wall 11 until the stop element 332 of the pivot unit 33 abuts against said one side of the second section 142 of the first stop member 14 proximate to the first wall 11. At this time, the inclined guiding surface 317 of the engaging hook 313 is aligned with the first opening 111 once again.

Accordingly, it is apparent from the above that in this embodiment, the engaging unit 31 may be disengaged from the protrusion 42 of the battery 102 by actuating the actuating member 312 to pivot the engaging unit 31 away from the first wall 11 by means of the structural design of the engaging unit 31. Moreover, the engaging hook 313 is brought to engage the engaging hole 43 simply by pushing the protrusion 42 into the receiving space 114 through the first opening 11 when the user intends to combine the battery 102 with the electronic device 101 without the need to actuate the actuating member 312 of the engaging unit 31. Moreover, actuation to the actuating member 312 of the engaging unit 31 may generate the linkage-movement effect that the battery 102 is slightly pushed out of the accommodating space 112 of the housing 1 when the user intends to remove the battery 102 from the electronic device 101. Therefore, during both combining and removing the battery 102 with and from the electronic device 101, convenience in using the present invention is promoted. In addition, the cover flange 310 not only covers a gap between the main body 311 and the edge that defines the second opening 113, but is also capable of dust prevention.

Figure 11:
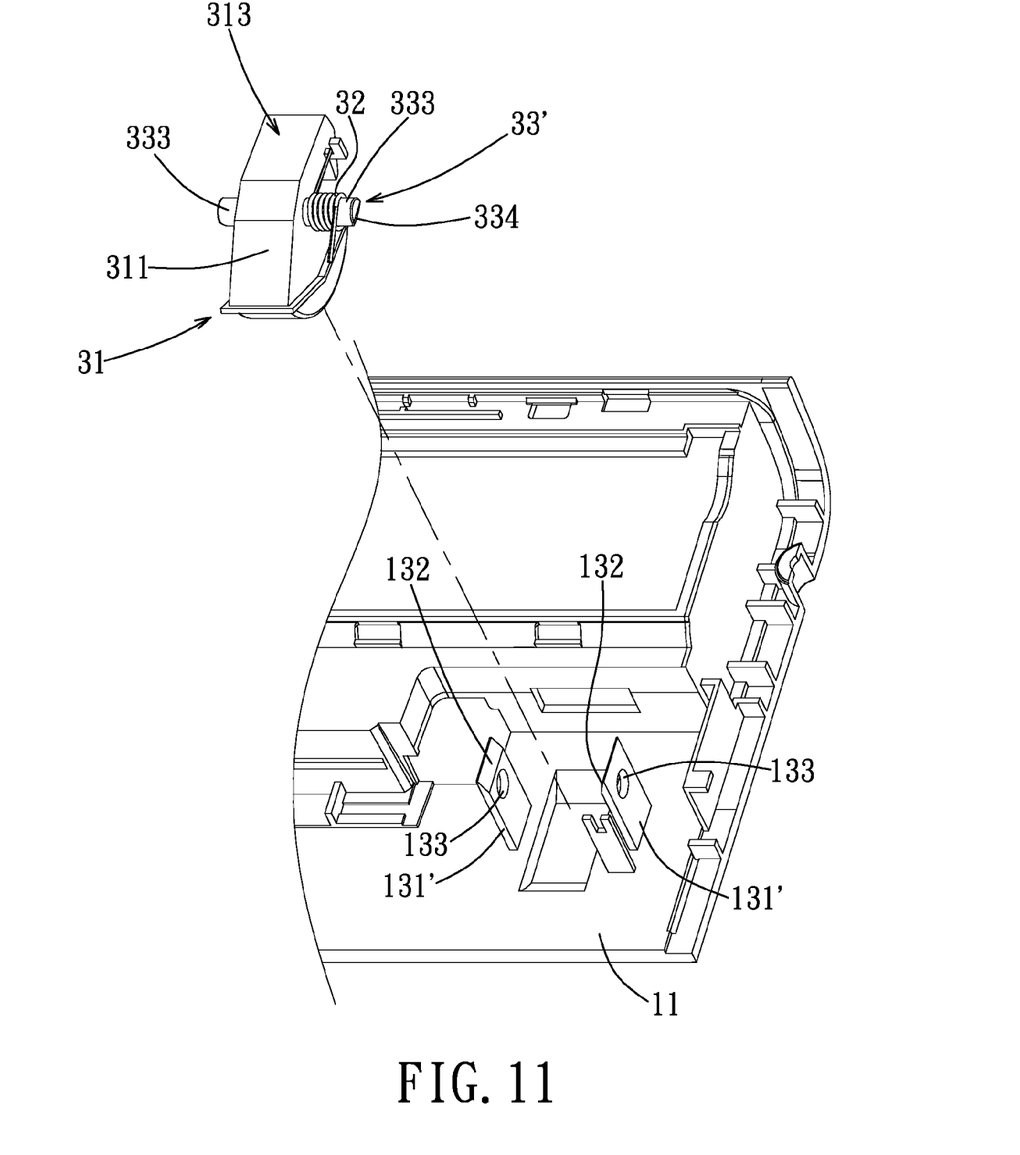
FIG. 11 is a partially enlarged exploded perspective view illustrating a variation of the first embodiment.
Figure 12:
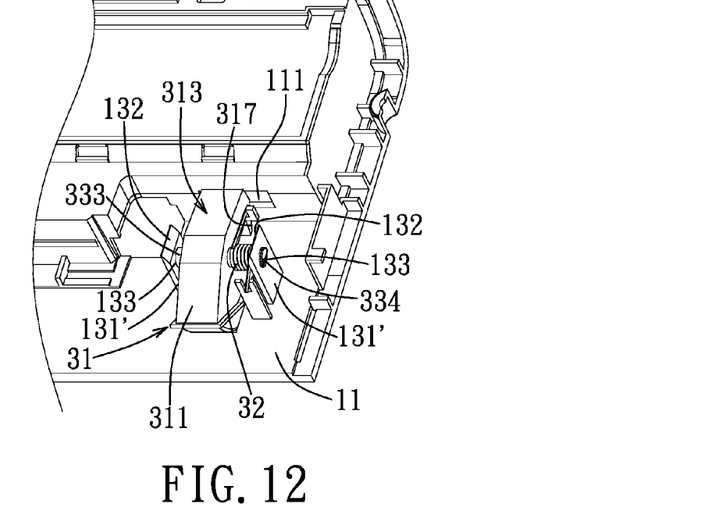
FIG. 12 is a partially enlarged assembled perspective view illustrating the variation of the first embodiment.

Referring to FIG. 11 and FIG. 12, in a variation of the first embodiment, the pivot unit 33' and the main body 311 of the engaging unit 31 are formed integrally. The pivot unit 33' includes two pivot sections 333 protruding outwardly from two opposite sides of the main body 311. Each of the pivot sections 333 has a distal end formed with a chamfered surface 334 inclining toward the main body 311 and the actuating member 312. A distance between the two distal ends of the pivot sections 333 is slightly longer than a distance between the two first pivot pieces 131'. Moreover, each of the first pivot pieces 131' has an inclined end surface 132 and is formed with a pivot groove 133. The inclined end surfaces 132 of the first pivot pieces 131' face each other and are inclined away from the first wall 11 and away from each other.

A structural design of the aforesaid pivot unit 33' and the first pivot pieces 131' is beneficial to combining the engaging unit 31 between the two first pivot pieces 131' of the pivot mount 13. The engaging unit 31 is adapted to be assembled with the two first pivot pieces 131' in a manner of disposing the engaging unit 31 between the two first pivot pieces 131' and pressing the engaging unit 31 toward the first wall 11. During the assembly process, the chamfered surface 334 of each of the pivot sections 333 abuts against the inclined end surface 132 of a respective one of the two first pivot pieces 131', and is guided by the inclined end surface 132 to be moved toward the first wall 11. Meanwhile, the first pivot pieces 131' are pushed against by the pivot sections 333 to defoim slightly in directions away from each other until the pivot sections 333 engage rotatably and respectively the pivot grooves 133 of the first pivot pieces 131', such that the main body 311 is disposed between the first pivot pieces 131' and is pivotable relative to the first wall 11. Moreover, the resilient element 32 is sleeved on one of the pivot sections 333.

Furthermore, in this variation of the first embodiment, structures such as the first stop member 14, the second stop member 18 and the stop element 332 may be omitted. The engaging unit 31 may remain in the steady state, where the inclined guiding surface 317 of the engaging hook 313 is aligned with the first opening 111, merely through the resilience of the resilient element 32.

Figure 13:
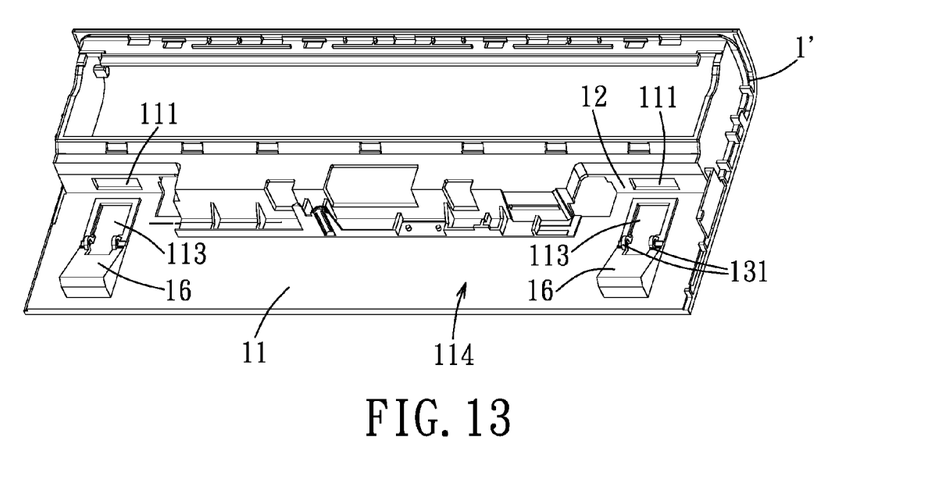
FIG. 13 is a perspective view illustrating a housing of a second embodiment of the assembly of an electronic device and a battery, according to the present invention.
Figure 14:
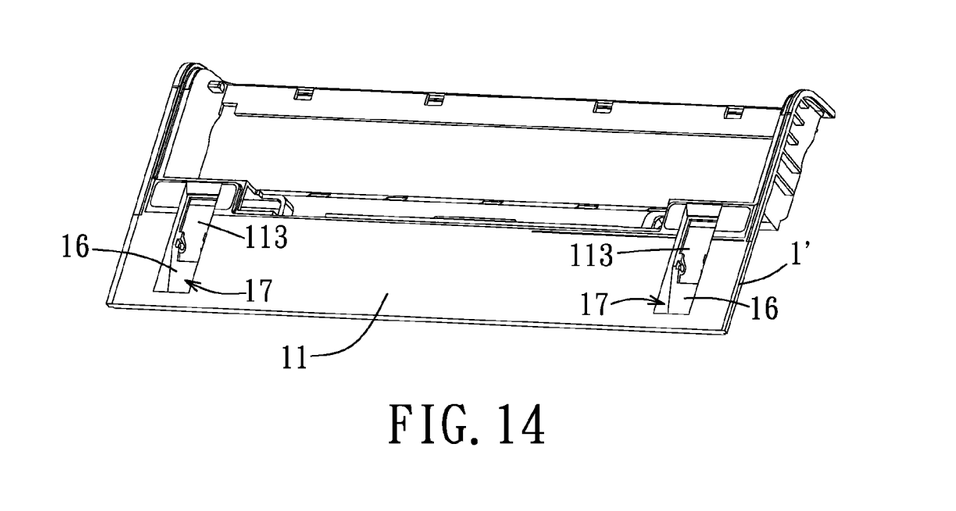
FIG. 14 is a perspective view from another angle illustrating the housing of the second embodiment.
Figure 15:
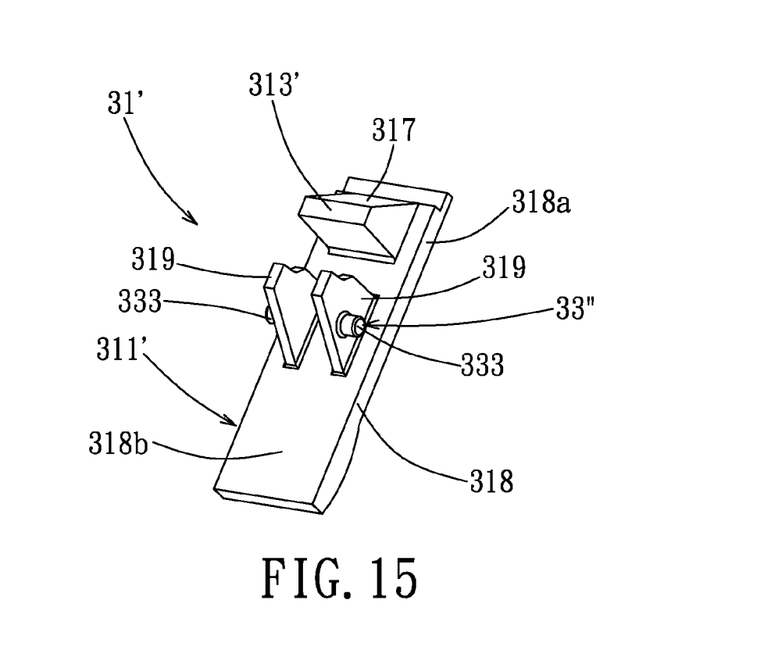
FIG. 15 is a perspective view of an engaging unit of the second embodiment.

Referring to FIG. 13 to FIG. 15, a second embodiment of the present invention differs from the first embodiment in the structure of the engaging unit 31', and in that the resilient element 32 is omitted in the second embodiment.

In the second embodiment of the present invention, the housing 1' further includes a pair of inclined stop walls 16, each of which is inclined away from the first wall 11 and the second wall 12, and is disposed in the receiving space 114 and adjacent to a respective one of the second openings 113. The inclined stop wall 16 defines a recess 17 which is formed recedingly in one side of the housing 1' opposite to the receiving space 114 and which is outside of the receiving space 114. The first pivot pieces 131 are located in the receiving space 114 between the inclined stop wall 16 and the second opening 113.

Figure 16:
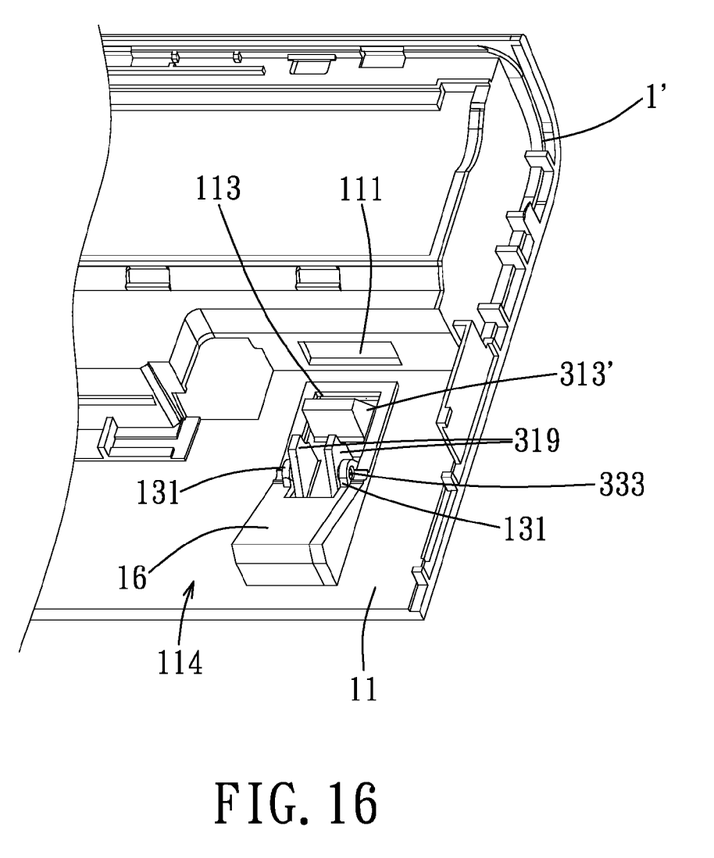
FIG. 16 is a partially enlarged assembled perspective view illustrating the housing and the engaging unit of the second embodiment.
Figure 17:
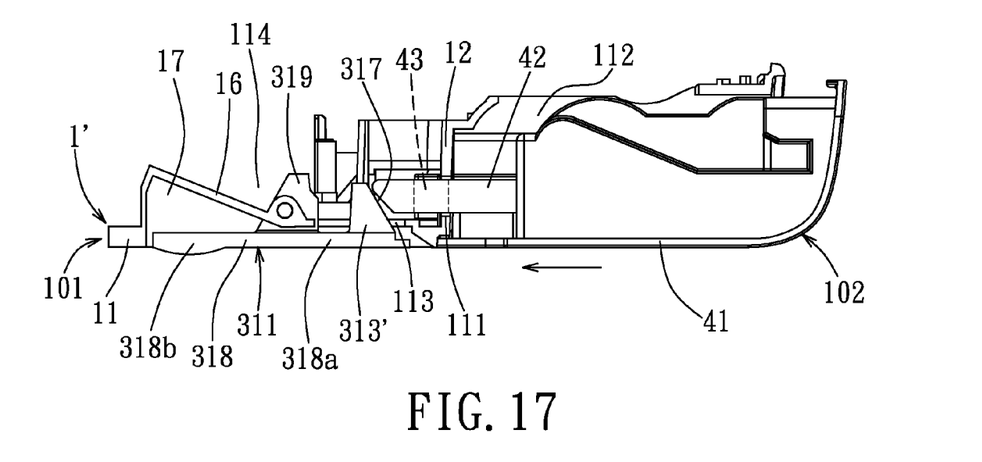
FIG. 17 to FIG. 19 are schematic side views illustrating operation of the engaging unit when the battery is combined with the electronic device.

Referring to FIG. 15 to FIG. 17, the engaging unit 31' is disposed outside of the receiving space 114 with the plate 318 which is located at the side of the housing 1' opposite to the receiving space 114. The second pivot pieces 319 are disposed between the first pivot pieces 131 of the pivot mount 13, and the pivot sections 333 (only one is shown in FIG. 16) are respectively disposed through and coupled rotatably to the first pivot pieces 131 such that the second pivot pieces 319 are pivotable along with the main body 311' relative to the first wall 11 of the housing 1'. After assembly of the engaging unit 31' with the housing 1', the first plate section 318a of the plate 318 corresponds to the second opening 113, the engaging hook 313' is extendible into the receiving space 114 through the second opening 113, and the second plate section 318b corresponds to the recess 17. Formation of the recess 17 enables the second plate section 318b of the plate 318 to be pushed into the recess 17 such that the first plate section 318a of the main body 311' is moved away from the receiving space 114 for removing the engaging hook 313' from the receiving space 114 through the second opening 113. Therefore, in the second embodiment, the actuating member of the engaging unit 31' is the second plate section 318b of the plate 318.

Referring to FIG. 15 to FIG. 17, the engaging unit 31' is disposed outside of the receiving space with the plate 318 which is located at the side of the housing 1' opposite to the receiving space. The second pivot pieces 319 are disposed between the first pivot pieces 131 of the pivot mount 13, and the pivot sections 333 (only one is shown in FIG. 16) are respectively disposed through and coupled rotatably to the first pivot pieces 131 such that the second pivot pieces 319 are pivotable along with the main body 311' relative to the first wall 11 of the housing 1'. After assembly of the engaging unit 31' with the housing 1', the first plate section 318a of the plate 318 corresponds to the second opening 113, the engaging hook 313' is extendible into the receiving space through the second opening 113, and the second plate section 318b corresponds to the recess 17. Formation of the recess 17 enables the second plate section 318b of the plate 318 to be pushed into the recess 17 such that the first plate section 318a of the main body 311' is moved away from the receiving space for removing the engaging hook 313' from the receiving space through the second opening 113. Therefore, in the second embodiment, the actuating member of the engaging unit 31' is the second plate section 318b of the plate 318.

Figure 18:
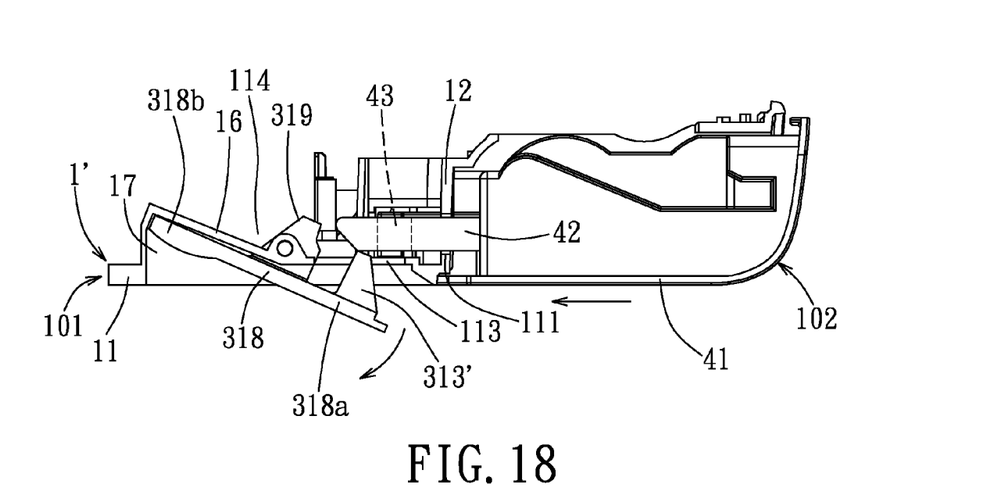
Figure 19:
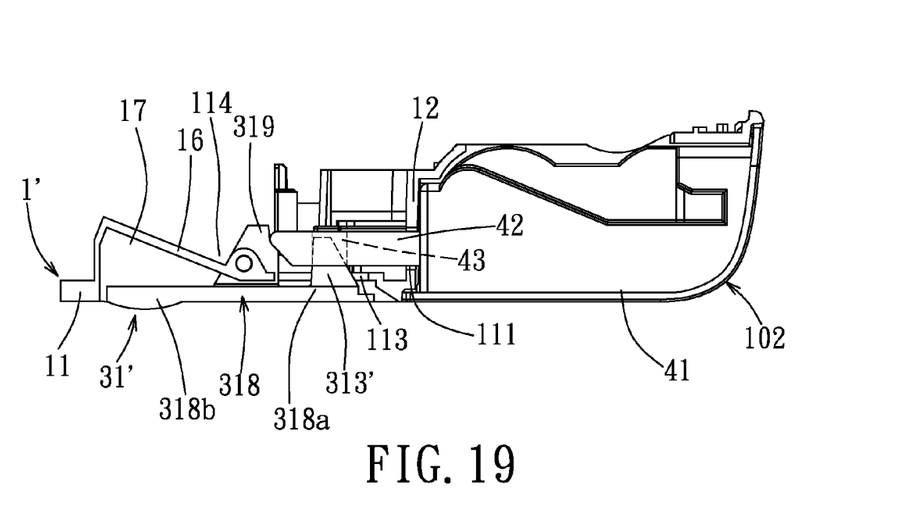

Referring to FIG. 17 to FIG. 19, the protrusion 42 of the battery 102 abuts against the inclined guiding surface 317 of the engaging hook 313' when the battery 102 is accommodated in the accommodating space 112 such that the protrusion 42 extends into the receiving space 114 through the first opening 111 in the second wall 12. Referring to FIG. 18, the engaging hook 313' is pushed against by the protrusion 42 to be moved away from the receiving space 114 through the second opening 113 as the protrusion 42 continues extending into the receiving space 114. The engaging hole 43 in the protrusion 42 is moved to correspond in position to the engaging hook 313' as the protrusion 42 continues extending into the receiving space 114 until the protrusion 42 abuts against the second pivot pieces 319 (only one is shown in FIG. 18) at portions distal from the pivot sections 333. Moreover, since the second pivot pieces 319 are pushed against by the protrusion 42, the plate 318 is brought to pivot relative to the first wall 11 with the engaging hook 313' moving toward the receiving space 114 such that the engaging hook 313' engages the engaging hole 43 in the protrusion 42 so as to form the structural interference between the engaging hook 313' and the protrusion 42 to thereby assemble the battery 102 with the electronic device 101.

Referring to FIG. 19, it is noted that in this embodiment, even though the engaging hook 313' engages the engaging hole 43 in the protrusion 42 in a direction reverse to the gravitational effect, the engaging hook 313' will not disengage from the engaging hole 43 in a direction away from the receiving space 114 through the second opening 113 by gravity since the second pivot pieces 319 (only one is shown) of the engaging unit 31' is urged by the protrusion 42 and since the weight of the engaging hook 313' is not sufficient to counter this urging force for pivoting the plate 318 relative to the first wall 11 to push the protrusion 42 with the second pivot pieces 319 to move in a direction away from the receiving space 114 through the first opening 111.

When it is desired to remove the battery 102 from the electronic device 101, the second plate section 318b of the plate 318 is pushed into the recess 17 so as to bring the plate 318 to pivot relative to the first wall 11 with the engaging hook 313' moving away from the receiving space 114 and disengaging from the engaging hole 43. Meanwhile, the protrusion 42 is pushed against by the second pivot pieces 319 to move away from the receiving space 114 through the first opening 111 such that the battery 102 is slightly pushed out of the accommodating space 112. Subsequently, the battery 102 can be moved to bring the protrusion 42 out of the receiving space 114 through the first opening 111 in the second wall 12 so as to remove the battery 102 from the accommodating space 112.

The inclined stop wall 16 in the second embodiment is configured to limit the range of pivot movement of the plate 318 resulting from pushing the second plate section 318b of the plate 318 into the recess 17. However, the recess 17 may be configured to be in direct spatial communication with the receiving space 114, and the inclined stop wall 16 may be replaced by other stop structures in other implementations.

Figure 20:
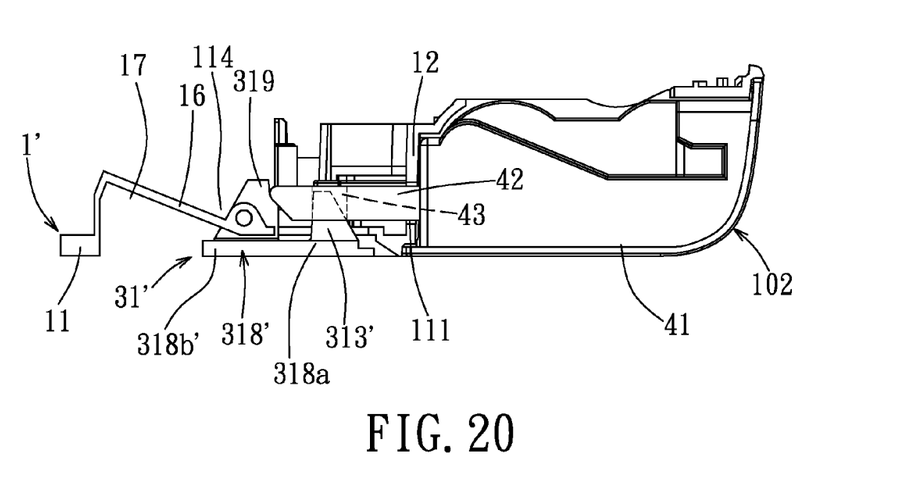
FIG. 20 is a side schematic view illustrating a variation of the second embodiment.

Referring to FIG. 20, in a variation of the second embodiment, the second plate section 318b' of the plate 318' may have a reduced length such that the recess 17 of the housing 1' is accessible externally of the housing 11. The engaging unit 31' may similarly be operated to pivot relative to the first wall 11 by extending a finger into the recess 17 and actuating a distal end of the second plate section 318b' when the user intends to remove the structural interference between the engaging hook 313' of the engaging unit 31' and the protrusion 42.

In summary, by means of the engaging unit 31, 31', a novel structure actuable by a poking operation is provided. Moreover, through the provision of the inclined guiding surface 317 of the engaging hook 313, 313', a user does not need to additionally actuate the engaging unit 31, 31' for the purpose of engaging the engaging unit 31, 31' with the engaging hole 43 in the battery 102 when the user intends to combine the battery 102 with the electronic device 101. Furthermore, the battery 102 is slightly pushed out of the housing 1, 1' of the electronic device 101 such that the user may remove the battery 102 from the electronic device 101 with relative ease when the engaging unit 31, 31' is actuated to remove the structural interference between the engaging hook 313, 313' and the protrusion 42.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An assembly of an electronic device and a battery, comprising: a battery including a protrusion that is formed with an engaging hole; and an electronic device including a housing defining a receiving space and formed with a first opening that is in spatial communication with said receiving space and that is adapted for extension of said protrusion of said battery into said receiving space when said battery is to combine with said electronic device, said housing including a first wall which extends parallel to a reference plane, and a second wall which is connected with said first wall, which extends perpendicular to the reference plane and which cooperates with said first wall to define said receiving space, said first opening being formed in said second wall, and an engaging mechanism including an engaging unit, said engaging unit including a main body pivotable relative to said first wall of said housing, an actuating member disposed on said main body and accessible from outside of said receiving space, and an engaging hook disposed on said main body adjacent to said first opening, said engaging hook being adapted for engaging said engaging hole in said protrusion when said battery is combined with said electronic device, said engaging hook having an inclined guiding surface which faces said first opening when said engaging hook is disposed in a steady state, said inclined guiding surface being pushed against by said protrusion of said battery as said protrusion extends into and through said first opening, such that said engaging hook moves to bring said main body to pivot relative to said first wall to permit further extension of said protrusion through said first opening, said actuating member being actuable to pivot said main body so as to disengage said engaging hook from said engaging hole;

wherein said first wall is formed with a second opening in spatial communication with the receiving space, said housing further including a pair of first pivot pieces which are disposed on said first wall and which are respectively located at two opposite sides of said second opening, each of said first pivot pieces having an inclined end surface and being formed with a pivot groove, said engaging mechanism further including a pivot unit which includes two pivot sections fixed to and protruding outwardly from two opposite sides of said main body, said inclined end surfaces of said first pivot pieces facing each other and being inclined away from said first wall and away from each other for guiding said pivot sections to be moved toward said first wall and to engage rotatably and respectively said pivot grooves such that said main body is disposed between said first pivot pieces and is pivotable relative to said first wall.

2. The assembly device as claimed in claim 1, wherein said engaging hook includes a first hook section and a second hook section, said first hook section extending from said main body toward said second wall, and said second hook section extending from said first hook section toward said first wall when said engaging hook is disposed in the steady state.

3. The assembly as claimed in claim 1, wherein said main body has a first portion generally disposed in said receiving space, and a second portion generally exposed outside of said receiving space through said second opening to serve as said actuating member of said engaging unit.

4. An assembly of an electronic device and a battery, comprising:

a battery including a protrusion that is formed with an engaging hole; and an electronic device including a housing defining a receiving space and formed with a first opening that is in spatial communication with said receiving space and that is adapted for extension of said protrusion of said battery into said receiving space when said battery is to combine with said electronic device, said housing including a first wall which extends parallel to a reference plane, and a second wall which is connected with said first wall, which extends perpendicular to the reference plane and which cooperates with said first wall to define said receiving space, said first opening being formed in said second wall, and an engaging mechanism including an engaging unit, said engaging unit including a main body pivotable relative to said first wall of said housing, an actuating member disposed on said main body and accessible from outside of said receiving space, and an engaging hook disposed on said main body adjacent to said first opening, said engaging hook being adapted for engaging said engaging hole in said protrusion when said battery is combined with said electronic device, said engaging hook having an inclined guiding surface which faces said first opening when said engaging hook is disposed in a steady state, said inclined guiding surface being pushed against by said protrusion of said battery as said protrusion extends into and through said first opening, such that said engaging hook moves to bring said main body to pivot relative to said first wall to permit further extension of said protrusion through said first opening, said engaging mechanism further including a resilient element configured to provide a biasing force to bias said engaging hook to remain in the steady state, where said engaging hook engages said engaging hole when said battery is combined with said electronic device, said actuating member being actuable to pivot said main body so as to disengage said engaging hook from said engaging hole;

wherein said first wall is formed with a second opening in spatial communication with the receiving space, said housing further including a pair of first pivot pieces which are disposed on said first wall and which are respectively located at two opposite sides of said second opening, said engaging mechanism further including a pivot unit, said main body being disposed between said first pivot pieces and being pivotable relative to said first wall by means of said pivot unit;

wherein said housing further includes a first stop member, said first stop member including a first section that is connected to and that extends away from said first wall, and a second section that extends from said first section to be spaced apart from said first wall; and wherein said pivot unit includes a pivot shaft extending through and fixed to said main body, and a stop element coupled to said pivot shaft, said stop element abutting against one side of said second section of said first stop member proximate to said first wall when said engaging hook engages said engaging hole in said protrusion.

5. The assembly as claimed in claim 4, wherein said housing further includes a first mounting element disposed on said first wall, said engaging unit further including a second mounting element, said resilient element including two resilient arms respectively mounted on said first and second mounting elements.

6. An assembly of an electronic device and a battery, comprising:

a battery including a protrusion that is formed with an engaging hole; and an electronic device including a housing defining a receiving space and formed with a first opening that is in spatial communication with said receiving space and that is adapted for extension of said protrusion of said battery into said receiving space when said battery is to combine with said electronic device, said housing including a first wall which extends parallel to a reference plane, and a second wall which is connected with said first wall, which extends perpendicular to the reference plane and which cooperates with said first wall to define said receiving space, said first opening being formed in said second wall, and an engaging mechanism including an engaging unit, said engaging unit including a main body pivotable relative to said first wall of said housing, an actuating member disposed on said main body and accessible from outside of said receiving space, and an engaging hook disposed on said main body adjacent to said first opening, said engaging hook being adapted for engaging said engaging hole in said protrusion when said battery is combined with said electronic device, said engaging hook having an inclined guiding surface which faces said first opening when said engaging hook is disposed in a steady state, said inclined guiding surface being pushed against by said protrusion of said battery as said protrusion extends into and through said first opening, such that said engaging hook moves to bring said main body to pivot relative to said first wall to permit further extension of said protrusion through said first opening, said actuating member being actuable to pivot said main body so as to disengage said engaging hook from said engaging hole;

wherein said first wall is formed with a second opening in spatial communication with the receiving space, said housing further including a pair of first pivot pieces which are disposed on said first wall and which are respectively located at two opposite sides of said second opening, said engaging mechanism further including a pivot unit, said main body being disposed between said first pivot pieces and being pivotable relative to said first wall by means of said pivot unit; and wherein said main body of said engaging unit is in the form of a plate and is disposed outside of said receiving space, said engaging hook of said engaging unit being formed protrudingly from said plate and being extendible into said receiving space through said second opening to engage said engaging hole in said protrusion of said battery when said battery is combined with said electronic device, said actuating member being an integral part of said plate actuable to remove said engaging hook from said receiving space through said second opening so as to be disengaged from said engaging hole.

7. The assembly as clamed in claim 6, wherein said engaging unit further includes a pair of second pivot pieces formed on said plate, coupled to and between said first pivot pieces by means of said pivot unit, and pivotable along with said main body relative to said first wall, said second pivot pieces being pushed against by said protrusion of said battery when said engaging hook engages said engaging hole in said protrusion so as to prevent pivotal movement of said main body which results in removal of said engaging hook from said receiving space through said second opening.

* * * * *